United States Patent
Asano et al.

(10) Patent No.: US 12,529,624 B2
(45) Date of Patent: Jan. 20, 2026

(54) MISFIRE DETERMINATION APPARATUS FOR INTERNAL COMBUSTION ENGINE

(71) Applicant: Honda Motor Co., Ltd., Tokyo (JP)

(72) Inventors: Nobukazu Asano, Tokyo (JP); Jun Iida, Tokyo (JP); Satoshi Kozuka, Tokyo (JP); Atsuhiro Miyauchi, Tokyo (JP); Hayato Watanabe, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 18/372,754

(22) Filed: Sep. 26, 2023

(65) Prior Publication Data
US 2024/0110848 A1 Apr. 4, 2024

(30) Foreign Application Priority Data
Sep. 30, 2022 (JP) .................................. 2022-157337

(51) Int. Cl.
*G01M 15/11* (2006.01)
*G01M 15/05* (2006.01)

(52) U.S. Cl.
CPC ................... *G01M 15/05* (2013.01)

(58) Field of Classification Search
CPC ....... G01M 15/05; G01M 15/06; G01M 15/11
See application file for complete search history.

(56) References Cited

U.S. PATENT DOCUMENTS

| | | | | |
|---|---|---|---|---|
| 5,440,921 A | * | 8/1995 | Matsuno | G01M 15/11 701/111 |
| 2017/0167952 A1 | * | 6/2017 | Hiroi | F02D 41/28 |
| 2023/0400002 A1 | * | 12/2023 | Watanabe | F02P 5/1521 |

FOREIGN PATENT DOCUMENTS

| | | |
|---|---|---|
| JP | H0533717 A | 2/1993 |
| JP | 2007030710 A | 2/2007 |
| JP | 2007198368 A | 8/2007 |
| JP | 2022077768 A | 5/2022 |

OTHER PUBLICATIONS

Japanese Office action; Application 2022-157337; Jul. 30, 2024.

* cited by examiner

*Primary Examiner* — Eric S. McCall
(74) *Attorney, Agent, or Firm* — Duft & Bornsen, PC

(57) ABSTRACT

A misfire determination apparatus for an internal combustion engine including a rotational speed detector detecting a rotational speed of an engine and a microprocessor. The microprocessor is configured to perform calculating a misfire parameter having a correlation with a change amount of the rotational speed in a combustion stroke of each of a plurality of cylinders and increasing as an increase amount of the rotational speed is large based on the rotational speed detected by the rotational speed detector, and determining that a single-cylinder misfire has occurred when the misfire parameter is less than a first predetermined value, while determining that the single-cylinder misfire or a multi-cylinder misfire has occurred when the misfire parameter is less than a second predetermined value greater than the first predetermined value.

14 Claims, 6 Drawing Sheets

| f0 | f1~f3 | f4 | MISFIRE PATTERN |
|----|-------|----|-----------------|
| ○  | ×     | ○  | SINGLE-CYLINDER MISFIRE |
| ×  | ×     | ×  | NORMAL |
| ×  | ×     | ○  | NORMAL |
| ○  | ○     | ○  | SINGLE OR MULTI-CYLINDER MISFIRE |
| ×  | ○     | ×  | NORMAL |
| ×  | ○     | ○  | MULTI-CYLINDER MISFIRE |

MISFIRE DETERMINATION APPARATUS FOR INTERNAL COMBUSTION ENGINE

CROSS-REFERENCE TO RELATED APPLICATION

This application is based upon and claims the benefit of priority from Japanese Patent Application No. 2022-157337 filed on Sep. 30, 2022, the content of which is incorporated herein by reference.

BACKGROUND OF THE INVENTION

Field of the Invention

This invention relates to a misfire determination apparatus for an internal combustion engine which determinations whether the internal combustion engine misfires.

Description of the Related Art

Efforts for the purpose of mitigating or reducing the influence of climate change have been continuously made conventionally, and research and development on emission improvement are being conducted in order to achieve the purpose. In this regard, conventionally, in an engine including a catalytic converter in an exhaust pipe, an apparatus is known in which a difference between a rotational speed of an internal combustion engine detected for each predetermined crank angle and a base rotational speed is integrated over the entire combustion stroke to calculate a misfire determination parameter, and the presence or absence of misfire is determined by determining whether or not the misfire determination parameter is smaller than a predetermined threshold. Such an apparatus is described in, for example, Japanese Unexamined Patent Publication No. 2007-198368 (JP2007-198368A).

In general, in an internal combustion engine having a plurality of cylinders, a rate of decrease in rotational speed when the plurality of cylinders are misfired is smaller than a rate of decrease when a single cylinder is misfired. Therefore, only by determining whether the misfire determination parameter is smaller than the predetermined threshold as in the apparatus described in JP2007-198368A, there is a possibility that the presence or absence of misfire in the internal combustion engine cannot be determined satisfactorily when the plurality of cylinders misfire.

SUMMARY OF THE INVENTION

An aspect of the present invention is a misfire determination apparatus for an internal combustion engine including a plurality of cylinders and an output shaft, the misfire determination apparatus including a rotational speed detector configured to detect a rotational speed of the output shaft and an electronic control unit having a microprocessor and a memory connected to the microprocessor. The microprocessor is configured to perform calculating a misfire parameter having a correlation with a change amount of the rotational speed in a combustion stroke of each of the plurality of cylinders based on the rotational speed detected by the rotational speed detector, the misfire parameter increasing as an increase amount of the rotational speed is large, and determining whether a misfire of the internal combustion engine has occurred and a manner of the misfire, based on the misfire parameter. The manner of the misfire includes a single-cylinder misfire where the misfire has occurred in a single cylinder among the plurality cylinders and a multi-cylinder misfire where the misfire has occurred in two or more cylinders among the plurality cylinders. The microprocessor is configured to perform the determining including determining that the single-cylinder misfire has occurred when the misfire parameter is less than a first predetermined value, while determining that the single-cylinder misfire or the multi-cylinder misfire has occurred when the misfire parameter is less than a second predetermined value greater than the first predetermined value.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 8. A misfire determination apparatus of an internal combustion engine according to the embodiment of the present invention is configured to determine whether a misfire of the internal combustion engine including a plurality of cylinders has occurred. First, a configuration of a gasoline engine as the internal combustion engine to which the present embodiment is applied will be described. The engine is mounted on a vehicle and is used as a drive source. The vehicle may be any of an engine vehicle that travels using only the engine as the drive source and a hybrid vehicle that travels using the engine and the motor as the drive source.

Figure 1:
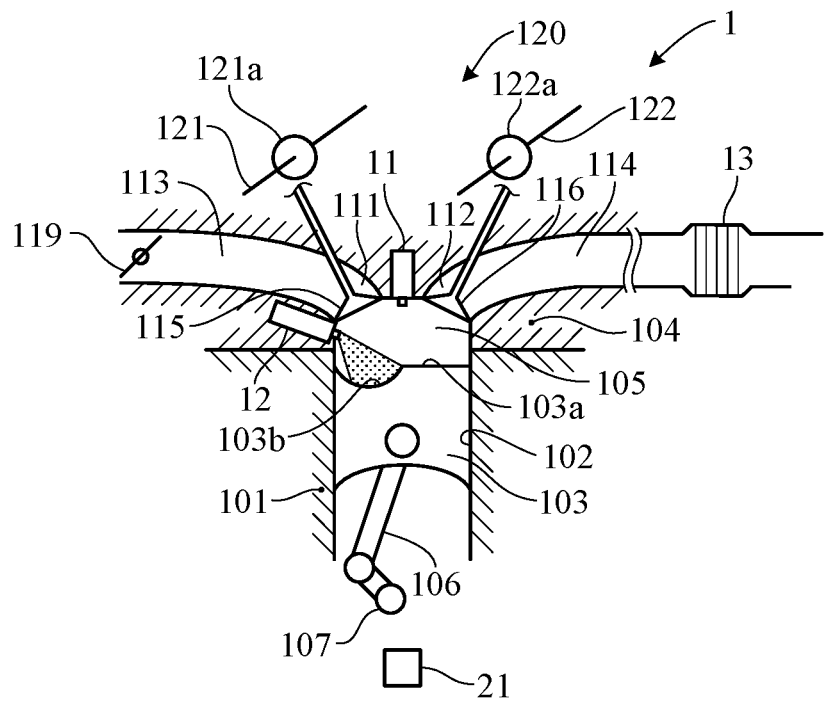
FIG. 1 is a diagram schematically illustrating a configuration of main components of an internal combustion engine to which a misfire determination apparatus according to an embodiment of the present invention is applied.

FIG. 1 is a diagram schematically illustrating a configuration of a main part of the engine 1 to which a misfire determination apparatus according to an embodiment of the present invention is applied. The engine 1 is a four-stroke engine, which goes through four strokes: intake, expansion, compression, and exhaust during operating cycle. The operation from a start of the intake stroke to an end of the exhaust stroke is referred to as "one cycle of the combustion stroke of the engine 1" or simply as "one cycle". The expansion stroke is a stroke in which a fuel-air mixture is combusted, and is also referred to as a combustion stroke. The engine 1 is a four-cylinder engine having four cylinders. If a plurality of cylinders are provided, the number of cylinders of the engine 1 is not limited to this, and may be a six-cylinder engine or an eight-cylinder engine. FIG. 1 illustrates a configuration of a single cylinder. The configurations of the cylinders are the same with each other.

As illustrated in FIG. 1, the engine 1 includes a cylinder 102 formed in a cylinder block 101, a piston 103 disposed slidably in the cylinder 102, and a combustion chamber 105 formed between the crown surface 103*a* of the piston 103 (piston crown surface) and a cylinder head 104. For example, a recess 103*b* is formed in the piston crown surface 103*a* so as to be along a tumble flow in the cylinder. The piston 103 is connected to a crankshaft 107 through a connecting rod 106 and rotates the crankshaft 107 by reciprocating of the piston 103 along the inner wall of the cylinder 102. The crankshaft 107 corresponds to an output shaft of the engine 1.

The cylinder head 104 is provided with an intake port 111 and an exhaust port 112. An intake passage 113 communicates with the combustion chamber 105 through the intake port 111, while an exhaust passage 114 communicates with the combustion chamber 105 through the exhaust port 112. The intake port 111 is opened and closed by an intake valve 115, and the exhaust port 112 is opened and closed by an exhaust valve 116. A throttle valve 119 is disposed on the upstream side of the intake passage 113 connected to the intake valve 115. The throttle valve 119 consists of, for example, a butterfly valve, and the amount of intake air supplied to the combustion chamber 105 is controlled by the throttle valve 119. The intake valve 115 and exhaust valve 116 are open and close driven by a valve train 120.

An ignition plug 11 and a direct-injection injector 12 are mounted on the cylinder head 104 so as to face the combustion chamber 105. The ignition plug 11 is disposed between the intake port 111 and exhaust port 112 and ignites a fuel-air mixture in the combustion chamber 105 by producing a spark at a predetermined timing by electrical energy.

The injector 12 is disposed near the intake valve 115 and injects fuel when driven by electrical energy. More specifically, the high-pressure fuel is supplied from a fuel tank to the injector 12 through a fuel pump. The injector 12 converts the fuel into high fine particles and injects the resulting fuel into the combustion chamber 105 obliquely downward at a predetermined timing. In FIG. 1, the injector 12 is configured as an in-cylinder injection type fuel injection valve. However, the injector 12 may be disposed otherwise and may be disposed, for example, to face the intake port 111, and may be configured as a port injection type injection valve.

The valve train 120 includes an intake cam shaft 121 and an exhaust cam shaft 122. The intake cam shaft 121 integrally includes intake cams 121*a* corresponding to the cylinders (cylinders 102), and the exhaust cam shaft 122 integrally includes exhaust cams 122*a* corresponding to the cylinders. The intake cam shaft 121 and exhaust cam shaft 122 are connected to the crankshaft 107 through timing belts (not shown) and rotate once each time the crankshaft 107 rotates twice.

The intake valve 115 is opened and closed by rotation of the intake cam shaft 121 through an intake rocker arm (not shown) at a predetermined timing corresponding to the profile of the intake cam 121*a*. The exhaust valve 116 is opened and closed by rotation of the exhaust cam shaft 122 through an exhaust rocker arm (not shown) at a predetermined timing corresponding to the profile of the exhaust cam 122*a*.

A catalyst device 13 for purifying exhaust gas is disposed on the exhaust passage 114. The catalyst device 13 is a device including a three-way catalyst having a function of removing and purifying HC, CO, and NOx contained in exhaust gas by oxidation and reduction. Other types of catalyst, such as an oxidation catalyst that oxidizes CO and HC in exhaust gas, may be used. When the temperature of the catalyst included in the catalyst device 13 is increased, the catalyst is activated, resulting in an increase in the exhaust gas purification effect of the catalyst device 13. Therefore, when the temperature of the catalyst is low at the time of starting the engine 1 or the like, an after burning of the mixture occurs, and thus an increase in the temperature of the catalyst is accelerated.

A crank angle sensor 21 is provided in the vicinity of the crankshaft 107. The crank angle sensor 21 is configured to output a pulse signal (crank signal) as the crankshaft 107 rotates. That is, each time the crankshaft 107 rotates by a predetermined angle (for example, 6°), the crank signal is output. Further, the crank angle sensor 21 outputs a cylinder signal for determining the cylinder of the engine 1 at a predetermined crank angle position of a specific cylinder, and outputs a top dead center signal when the piston 103 is at a predetermined crank angle position slightly ahead of the top dead center in any of the cylinders.

Figure 2:
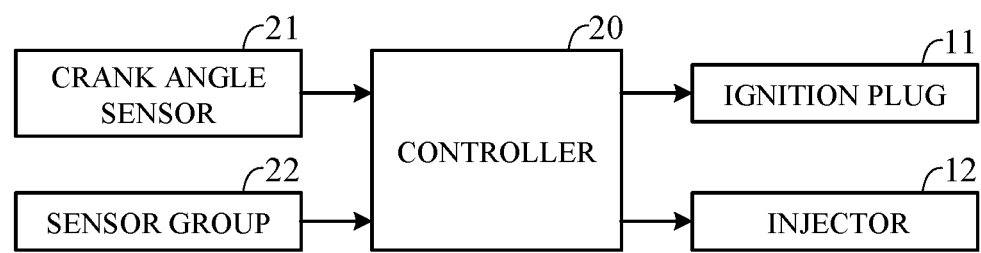
FIG. 2 is a block diagram illustrating a configuration for controlling of the engine of FIG. 1.

FIG. 2 is a block diagram schematically illustrating a configuration for controlling the engine 1. As illustrated in FIG. 2, signals from the crank angle sensor 21 and another sensor 22 (referred to as a sensor group for convenience) are input to the controller 20. The controller 20 specifies the rotation angle (crank angle) of the crankshaft 107 with respect to the position of the top dead center TDC of the piston 103 based on the signal from the crank angle sensor 21, and calculates the engine speed. The sensor group 22 includes an accelerator opening sensor for detecting an operating amount of an accelerator pedal, a water temperature sensor for detecting a temperature of an engine coolant, an intake air amount sensor for detecting an intake air amount into the engine 1, an AF sensor for detecting an air-fuel ratio of an exhaust gas, and the like.

The controller 20 is an electronic control unit (ECU) for an engine control, and includes a computer including an arithmetic unit such as a CPU, a storage unit such as a ROM or RAM, and other peripheral circuitry. The controller 20 executes a predetermined processing based on signals from the crank angle sensor 21 and the sensor group 22, and outputs a control signal to the ignition plug 11 and the injector 12 according to the operation mode. That is, the controller 20 controls the operations of the ignition plug 11 and the injector 12 in accordance with a map or a characteristic corresponding to an operating state such as a catalyst warm-up mode in which warm-up of the catalyst device 13 is promoted to realize early activation of the catalyst, a homogeneity improvement mode in which fuel efficiency is optimized, and a knock suppression mode in which occurrence of knocking is suppressed.

More specifically, the controller 20 outputs a control signal to the ignition plug 11 so that the ignition timing is retarded more than the optimum ignition timing MBT in the catalyst warm-up mode, the ignition timing becomes the MBT or is retard to suppress knocks in the homogeneity improvement mode after the completion of the catalyst warm-up, and the retarded ignition timing is advanced from the retard to MBT side in the knock suppression mode. In addition, the controller 20 calculates a target injection amount per one cycle in accordance with the intake air amount detected by the intake air amount sensor while performing feedback control so that an actual air-fuel ratio detected by the AF sensor becomes a target air-fuel ratio (e.g., a theoretical air-fuel ratio). Then, the controller 20 calculates a target injection amount (unit target injection amount) per one time in consideration of the number of injections of the injector 12 per one cycle, and outputs a control signal to the injector 12 so that the injector 12 injects the unit target injection amount at a predetermined timing.

When controlling the ignition plug 11 and the injector 2, the controller 20 executes a misfire determination processing for determining presence or absence of misfire in the engine 1. In the misfire determination processing, a misfire parameter is calculated for each cylinder during the combustion stroke (expansion stroke), and the presence or absence of a misfire is determined for each cylinder using the misfire parameter. The misfire parameter is calculated based on a signal from the crank angle sensor 21 as follows. In the following description, the four cylinders of the engine 1 are referred to as a #1 cylinder, a #2 cylinder, a #3 cylinder, and a #4 cylinder in the order of ignition. The misfire tends to occur when the combustion torque is low, and also easily occurs when the ignition timing is retarded in the catalyst warm-up mode or the like.

Figure 3A:
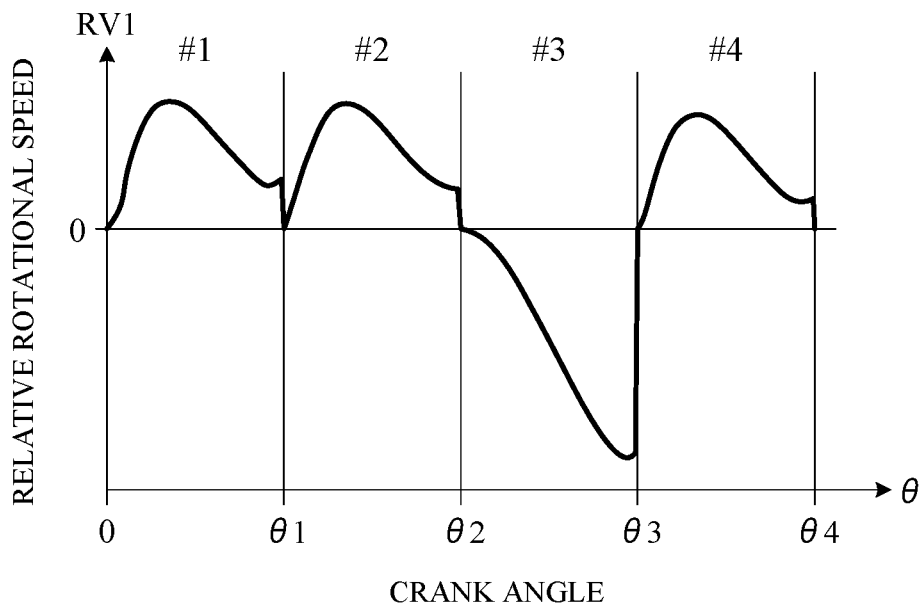
FIG. 3A is a diagram illustrating a change in a relative rotational speed with respect to a rotational speed detected in the vicinity of a compression top dead center of each cylinder of the engine.

FIG. 3A is a diagram illustrating a change in a relative rotational speed RV1 with the rotational speed detected in the vicinity of the compression top dead center of each cylinder in one cycle of the engine 1 as a reference (referred to as a base rotational speed RV0). The relative rotational speed RV1 is calculated by subtracting the base rotational speed RV0 from the rotational speed RV calculated on the basis of a generation time interval of a crank signal. In FIG. 3A, the #1 cylinder undergoes a combustion stroke in a range of a crank angle θ of 0 to θ1 (180°), the #2 cylinder undergoes the combustion stroke in a range of θ1 to θ2 (360°), the #3 cylinder undergoes the combustion stroke in a range of θ2 to θ3, and the #4 cylinder undergoes the combustion stroke in a range of θ3 to θ4 (720°).

In the example of FIG. 3A, the relative rotational speeds RV1 of the #1 cylinder, the #2 cylinder, and the #4 cylinder are larger than the relative rotational speed RV1 of the #3 cylinder. In the combustion stroke (expansion stroke) after the compression top dead center, the relative rotational speed RV1 becomes smaller when misfire occurs than when no misfire occurs. Therefore, it is estimated that combustion is normal in the #1 cylinder, the #2 cylinder, and the #4 cylinder, and misfire has occurred in the #3 cylinder.

The memory of a controller 20 stores data (crank angle data) of the generation time interval of the crank signal output at every predetermined crank angle (6°) in the latest one cycle. Then, the controller 20 integrates the relative rotational speed RV1 for each predetermined crank angle calculated from the crank angle data over the combustion stroke of each cylinder and calculates the integrated value as a misfire parameter α of each cylinder. The controller 20 may perform filter processing of canceling a linear change in a period (720°) of one cycle on the relative rotational speed RV1 and then calculate the misfire parameter α by using the relative rotational speed RV1 after the filter processing. Correction may be performed on the relative rotational speed RV1 so as to compensate for an inertial force rotational speed component caused by an inertial force of a movable part of the engine 1, and then the misfire parameter α may be calculated by using the relative rotational speed RV1 after the correction.

Figure 3B:
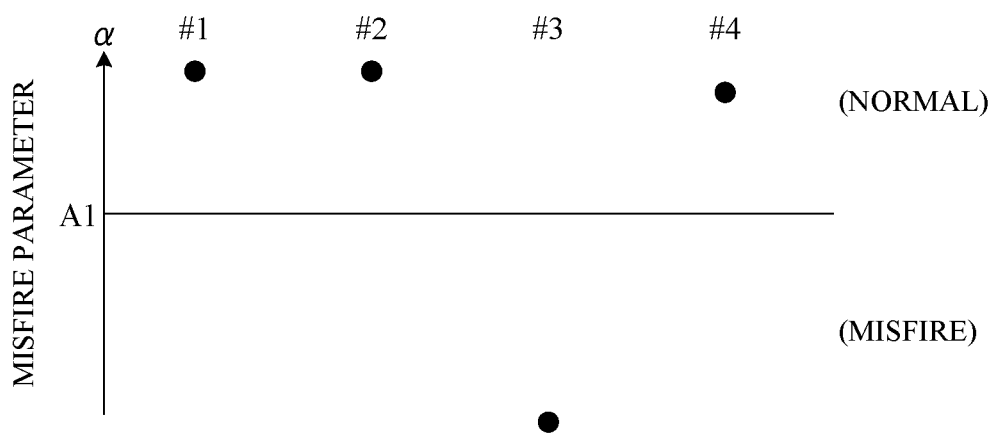
FIG. 3B is a diagram illustrating a misfire parameter corresponding to the relative rotational speed of FIG. 3A.

FIG. 3B is a diagram illustrating the misfire parameter α corresponding to the relative rotational speed RV1 of FIG. 3A. As illustrated in FIG. 3B, the misfire parameter α for the #1 cylinder, the #2 cylinder, and the #4 cylinder is larger than the misfire parameter α for the #3 cylinder. Therefore, it is possible to determine the presence or absence of misfire of each cylinder by setting a threshold A1 so as to distinguish these misfire parameters α and comparing the magnitude of the misfire parameter α with the threshold A1.

As illustrated in FIG. 3B, in the case of single-cylinder misfire in which a single #3 cylinder is misfired, a difference in the misfire parameter α between the cylinder (referred to as a misfire cylinder) and a cylinder (referred to as a normal cylinder) which is combusted normally, that is, the #1 cylinder, the #2 cylinder, and the #4 cylinder is large. However, in the case of multi-cylinder misfire in which a plurality of cylinders are misfired, the amount of decrease in the relative rotational speed RV1 for the misfire cylinder is smaller than that in the case of the single-cylinder misfire. Therefore, it is difficult to satisfactorily determine the presence or absence of misfire only by comparing the magnitude of the misfire parameter α with a single threshold A1. In particular, at the time of weak combustion in which a combustion torque is small, the misfire parameter α for the normal cylinder becomes small, and a difference from the misfire parameter α for the misfire cylinder decreases, so that it is more difficult to accurately determine the presence or absence of misfire. This point will be further described.

Figure 4:
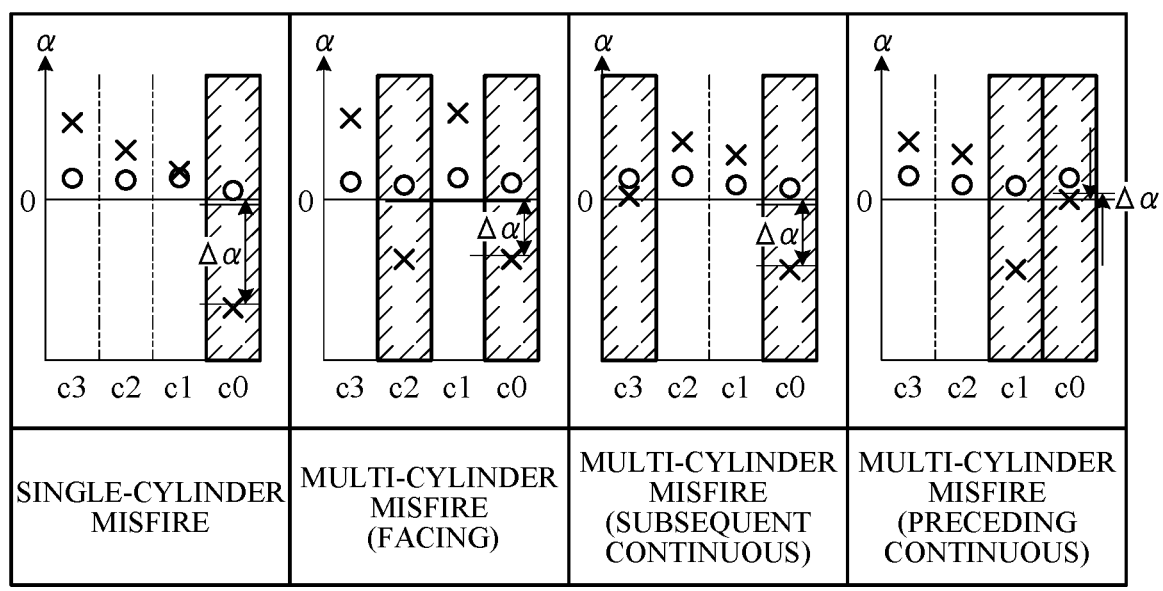
FIG. 4 is a diagram illustrating a change in the misfire parameter corresponding to a plurality of patterns of misfire of the engine.

FIG. 4 is a diagram illustrating a change in the misfire parameter α for one cycle (720°) for each of a plurality of patterns of misfire of the engine 1. Hereinafter, for convenience, a cylinder in the combustion stroke or immediately after the combustion stroke is completed, that is, a cylinder in which the latest misfire parameter α is obtained is referred to as a subject cylinder c0, a cylinder in the combustion stroke immediately before the subject cylinder c0 is referred to as a first reference cylinder c1, a cylinder in the combustion stroke immediately before the first reference cylinder c1 is referred to as a second reference cylinder c2, and a cylinder in the combustion stroke immediately before the second reference cylinder c2 is referred to as a third reference cylinder c3. The subject cylinder c0 is a cylinder to be subjected to the determination on the presence or absence of misfire, and the reference cylinders c1 to c3 are cylinders different from the subject cylinder c0.

The first reference cylinder c1 is a cylinder which undergoes the combustion stroke one time before (here, a crank angle of 180° before) the subject cylinder c0, the second reference cylinder c2 is a cylinder which undergoes the combustion stroke two times before (here, a crank angle of 360° before) the subject cylinder c0, and the third reference cylinder c3 is a cylinder which undergoes the combustion stroke three times before (here, a crank angle of 540° before) the subject cylinder c0. For example, when the #1 cylinder is the subject cylinder c0, the #4 cylinder is the first reference cylinder c1, the #3 cylinder is the second reference cylinder c2, and the #2 cylinder is the third reference cylinder c3. When the #3 cylinder is the subject cylinder c0, the #2 cylinder is the first reference cylinder c1, the #1 cylinder is the second reference cylinder c2, and the #4 cylinder is the third reference cylinder c3. The subject cylinder c0 is sequentially switched every time the crank angle changes by 180°.

An "O" mark in FIG. 4 indicates a change in the misfire parameter α in a case where no misfire occurs in all the cylinders c0 to c3, that is, in the case of a normal cycle in which all the cylinders c0 to c3 are normal cylinders. A "x" mark indicates a change in the misfire parameter α in a case where misfire has occurred in some cylinders, that is, in the case of a misfire cycle including misfire cylinders. The misfire parameter α varies to some extent every cycle, and the "0" mark and the "x" mark are the average value or the median value of the misfire parameter α in consideration of the variation.

The misfire pattern includes a single-cylinder misfire in which only the subject cylinder c0 is misfired and a multi-cylinder misfire in which the subject cylinder c0 and any of the first reference cylinder c1, the second reference cylinder c2, and the third reference cylinder c3 are misfired. The multi-cylinder misfire is divided into a facing misfire, a subsequent continuous misfire, and a preceding continuous misfire. In the facing misfire, the subject cylinder c0 and the second reference cylinder c2 in which the order of the combustion stroke is not continuous with the subject cylinder c0 are misfired. In the subsequent continuous misfire, the subject cylinder c0 and the third reference cylinder c3 in which the order of the combustion stroke is continuous to the subject cylinder c0 and which undergoes the combustion stroke after the subject cylinder c0 are misfired. In the preceding continuous misfire, the subject cylinder c0 and the first reference cylinder c1 in which the order of the combustion stroke is continuous to the subject cylinder c0 and which undergoes the combustion stroke before the subject cylinder c0 are misfired.

In FIG. 4, a cylinder with a small combustion torque, that is, a cylinder with weak combustion is indicated by hatching. The misfire pattern of FIG. 4 is regularly repeated. Therefore, for example, in the subsequent continuous misfire, misfire occurs in the subject cylinder c0 and the third reference cylinder c3 next to the subject cylinder c0. If the current subject cylinder is the #3 cylinder and the subsequent continuous misfire occurs, the misfire repeatedly occurs in the #3 cylinder and the #4 cylinder in the combustion cycle of the engine 1. In FIG. 4, the subject cylinder c0 is a cylinder of weak combustion, and the misfire has occurred in cylinders of weak combustion (hatched region) including the subject cylinder c0 in all misfire patterns.

When misfire occurs in the subject cylinder c0, the base rotational speed (the rotational speed calculated in the vicinity of the compression top dead center) RV0 at the time of calculating the misfire parameter of the third reference cylinder c3 to be the next subject cylinder c0 decreases. Therefore, as illustrated in FIG. 4, in all misfire patterns, the misfire parameter α of the third reference cylinder c3 is larger than the misfire parameter α of the subject cylinder c0. In addition, the misfire parameter α ("x" mark) when misfire occurs in the subject cylinder c0 is smaller than the misfire parameter α ("O" mark) at the time of normal combustion for the subject cylinder c0. However, in the multi-cylinder misfire, the misfire parameter α of the subject cylinder c0 is affected by the misfire of the other cylinders c1 to c3, and thus the amount of decrease in the misfire parameter α is smaller than that at the time of the single-cylinder misfire. In particular, in the case of the preceding continuous misfire, the base rotational speed RV0 at the start of the combustion stroke in the subject cylinder c0 decreases due to the strong influence of the misfire in the immediately preceding first reference cylinder c1, and thus the relative rotational speed RV1 increases, and the misfire parameter α of the subject cylinder c0 tends to increase.

Focusing on a difference Δα between the misfire parameter α (minimum value of the variation of the misfire parameter) of the subject cylinder c0 in the normal cycle and the misfire parameter α (maximum value of the variation of the misfire parameter) of the subject cylinder c0 in the misfire cycle, the magnitude of the difference Δα varies depending on the pattern of misfire, and the difference Δα is the smallest in the preceding continuous misfire. As a result, there is a possibility that the misfire cannot be accurately determined only by comparing the magnitude of the misfire parameter α with the threshold A1 (FIG. 3B). That is, when the threshold A1 is set excessively small, it may be erroneously determined that the combustion is normal although the misfire has occurred, and when the threshold A1 is set excessively large, it may be erroneously determined that the misfire has occurred although the combustion is normal. Therefore, in order to accurately determine the presence or absence of misfire even at the time of weak combustion or the like, the present embodiment configures a misfire determination apparatus as follows.

Figure 5:
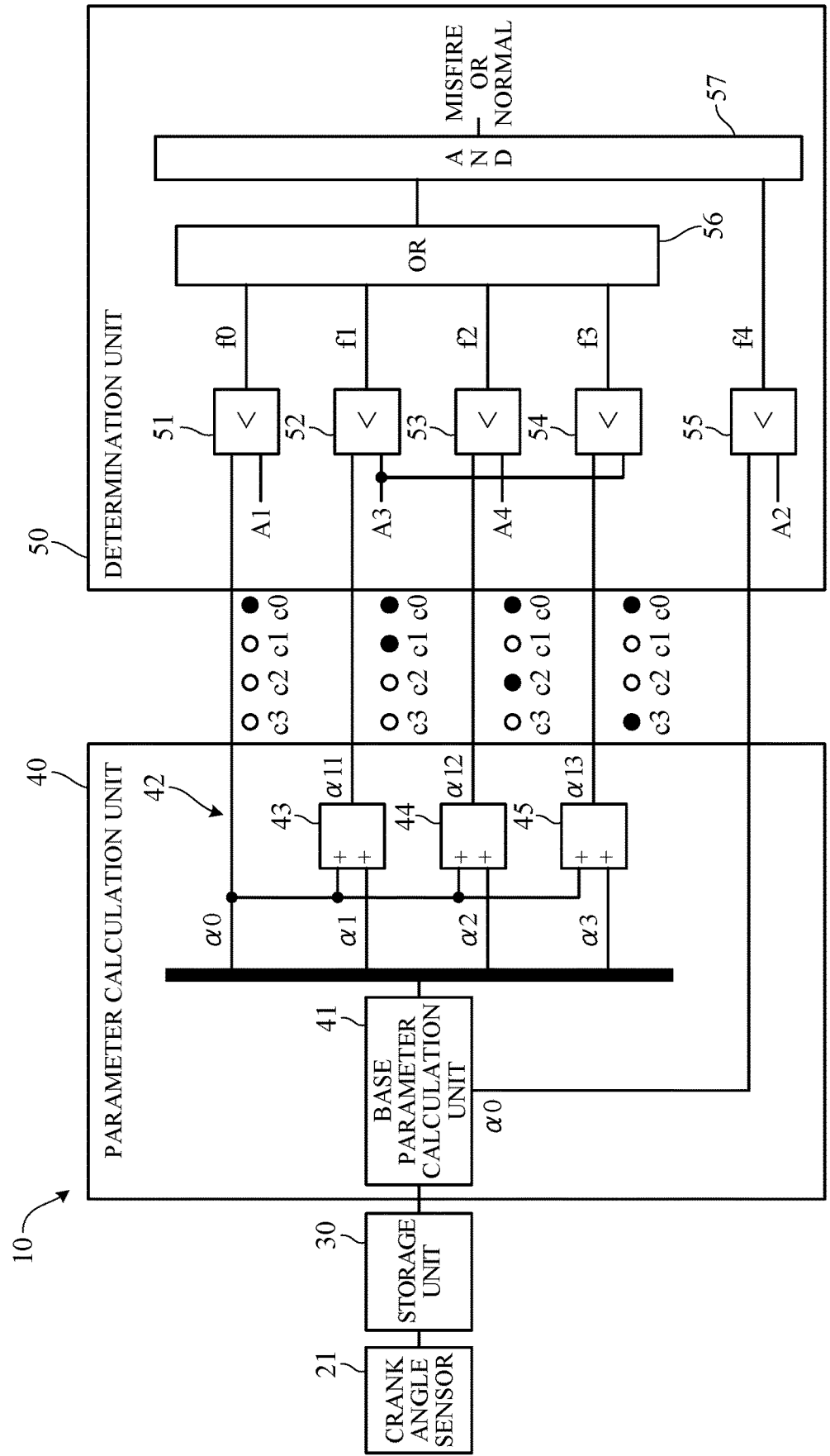
FIG. 5 is a block diagram illustrating a configuration of main portion of the misfire determination apparatus for the internal combustion engine according to the embodiment of the present invention.

FIG. 5 is a block diagram illustrating a configuration of main portion of the misfire determination apparatus 10 according to the present embodiment. As illustrated in FIG. 5, the misfire determination apparatus 10 includes a crank angle sensor 21, a storage unit 30, a parameter calculation unit 40, and a determination unit 50. The storage unit 30, the parameter calculation unit 40, and the determination unit 50 are functional configurations of the controller 20. Therefore, the misfire determination apparatus 10 is configured by the crank angle sensor 21 and the controller 20 including a CPU (microprocessor) and memory connected to the CPU in terms of hardware.

The storage unit 30 is a buffer memory which temporarily stores the crank signal from the crank angle sensor 21. The storage unit 30 stores data of the generation time interval of the crank signal in a range from the current crank angle to the crank angle which is at least one cycle (720°) back therefrom, that is, the latest crank angle data for one cycle. In other words, the crank angle data that makes it possible to calculate the change in the relative rotational speed RV1 and the misfire parameter α for each of the subject cylinder c0, the first reference cylinder c1, the second reference cylinder c2, and the third reference cylinder c3 as illustrated in FIG. 4 is stored.

The parameter calculation unit 40 includes a base parameter calculation unit 41 and a sum parameter calculation unit 42. As described above, on the basis of the crank angle data stored in the storage unit 30, the base parameter calculation unit 41 calculates the relative rotational speed RV1 of each cylinder in the combustion stroke of the engine 1 and calculates the misfire parameter α of each cylinder by integrating the relative rotational speed RV1 over the combustion stroke (expansion stroke) of each cylinder. That is, the misfire parameter α of each of the subject cylinder c0, the first reference cylinder c1, the second reference cylinder c2, and the third reference cylinder c3 is calculated. In FIG. 5, the misfire parameters α of the subject cylinder c0, the first reference cylinder c1, the second reference cylinder c2, and the third reference cylinder c3 are represented by α0, α1, α2, and α3, respectively.

The misfire parameter α0 may be stored in the storage unit 30 every time the base parameter calculation unit 41 calculates the misfire parameter α0 of the subject cylinder c0, and the misfire parameters α0, α1, and α2 may be changed to α1, α2, and α3, respectively, every time the cylinder in the combustion stroke moves. As a result, since the misfire parameters α of the first reference cylinder c1, the second reference cylinder c2, and the third reference cylinder c3 are already stored in the storage unit 30 at the time of calculating the misfire parameter α of the subject cylinder c0, the base parameter calculation unit 41 only needs to calculate the misfire parameter α0 of the subject cylinder c0, and a processing load can be reduced.

The sum parameter calculation unit 42 includes addition circuits 43 to 45 which perform the addition processing of the misfire parameter α. The addition circuit 43 adds the misfire parameter α0 of the subject cylinder c0 and the misfire parameter α1 of the first reference cylinder c1 to calculate a sum parameter α11. The addition circuit 44 adds the misfire parameter α0 of the subject cylinder c0 and the misfire parameter α2 of the second reference cylinder c2 to calculate a sum parameter α12. The addition circuit 45 adds the misfire parameter α0 of the subject cylinder c0 and the misfire parameter α3 of the third reference cylinder c3 to calculate a sum parameter α13.

The determination unit 50 includes comparison circuits 51 to 55 which compare the misfire parameter α with the thresholds A1 to A4, an OR circuit 56, and an AND circuit 57. In FIG. 5, among the plurality of cylinders c0 to c3, a cylinder which is a subject for the misfire determination is indicated by a black circle, and the other cylinders are indicated by white circles between the parameter calculation unit 40 and the determination unit 50. The comparison circuit 51 determines the magnitude of the misfire parameter α0 of the subject cylinder c0 and the predetermined threshold A1. The threshold A1 (FIG. 3B) is set in consideration of the amount of decrease in the misfire parameter α at the time of the single-cylinder misfire. That is, the threshold A1 is set in association with the change in the misfire parameter α when the single-cylinder misfire occurs in each of the plurality of cylinders.

Figures 6, 7:
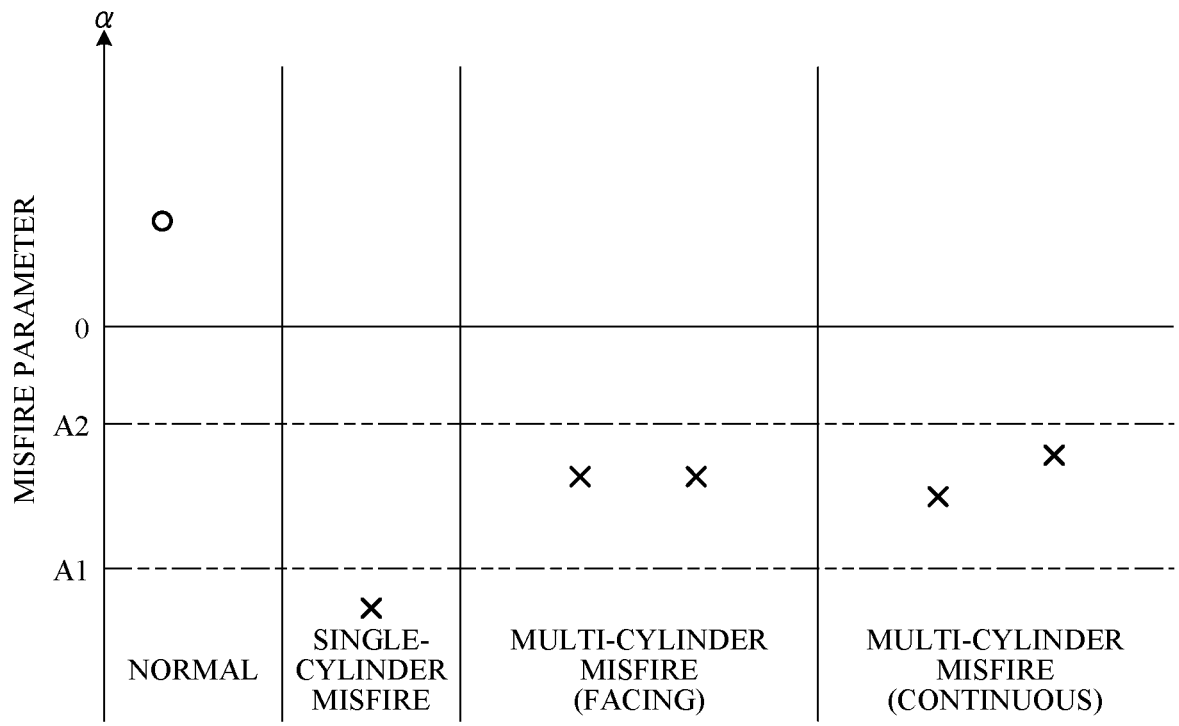
FIG. 6 is a diagram illustrating an example of the misfire parameter of a normal cycle and the misfire parameter of a misfire cycle side by side.
FIG. 7 is a diagram illustrating a relationship between a flag signal output from the block diagram of FIG. 5 and the patterns of misfire.

FIG. 6 is a diagram illustrating an example of the misfire parameter α ("O" mark) of a normal cycle and the misfire parameter α ("x" mark) of a misfire cycle side by side. As illustrated in FIG. 6, in the misfire cycle, the misfire parameter α at the time of the single-cylinder misfire is smaller than the misfire parameter α at the time of the multi-cylinder misfire. In consideration of the amount of decrease in the misfire parameter α assumed at the time of the single-cylinder misfire and the amount of decrease in the misfire parameter α assumed at the time of the multi-cylinder misfire due to weak combustion, the threshold A1 is set to a value larger than the misfire parameter α assumed at the time of the single-cylinder misfire and smaller than the misfire parameter α assumed at the time of the multi-cylinder misfire. When the comparison circuit 51 of FIG. 5 determines that the misfire parameter α0 of the subject cylinder c0 is less than the threshold A1, there is a possibility that the single-cylinder misfire has occurred in the subject cylinder c0. In this case, the comparison circuit 51 outputs a flag signal f0 indicating the possibility of the single-cylinder misfire.

The comparison circuit 55 determines the magnitude of the misfire parameter α0 of the subject cylinder c0 and a predetermined threshold A2. The threshold A2 is set in consideration of the amount of decrease in the misfire parameter α0 assumed at the time of the multi-cylinder misfire due to weak combustion. That is, the threshold is set in association with the change in the misfire parameter α0 of the subject cylinder c0 when each of all combinations (c0, c1), (c0, c2), and (c0, c3) of the subject cylinder c0 and the other cylinders c1 to c3 among the plurality of cylinders causes misfire (multi-cylinder misfire). As illustrated in FIG. 6, the threshold A2 is set to a value larger than the threshold A1. More specifically, in consideration of the amount of decrease in the misfire parameter α assumed at the time of the multi-cylinder misfire and the amount variation in the misfire parameter α assumed at the time of normal combustion, the threshold A2 is set to a value larger than the misfire parameter α0 of the subject cylinder c0 assumed at the time of the multi-cylinder misfire and smaller than the misfire parameter α assumed at the time of normal combustion.

When the comparison circuit 55 of FIG. 5 determines that the misfire parameter α0 of the subject cylinder c0 is less than the threshold A2, there is a possibility that the single-cylinder misfire has occurred in the subject cylinder c0 (α<A1<A2), or the multi-cylinder misfire has occurred in the subject cylinder c0 and any of the other cylinders c1 to c3 (A1<α<A2). In this case, the comparison circuit 55 outputs a flag signal f4 indicating that there is a possibility of the single-cylinder misfire or the multi-cylinder misfire. As described above, the condition for determining that the misfire occurs in the subject cylinder c0 is that at least the flag signal f4 is output, and when the flag signal f4 is not output, it is determined that misfire does not occur in the subject cylinder c0.

The comparison circuit 52 determines the magnitude of the sum parameter α11 and a predetermined threshold A3. The comparison circuit 53 determines the magnitude of the sum parameter α12 and a predetermined threshold A4. The comparison circuit 54 determines the magnitude of the sum parameter α13 and the predetermined threshold A3. The threshold A3 is set corresponding to the continuous misfire, and the threshold A4 is set corresponding to the facing misfire.

More specifically, the threshold A3 is set in consideration of the amount of decrease in the plurality of misfire parameters α assumed at the time of continuous misfire due to weak combustion. That is, the threshold A3 is set in association with a change in the sum parameters α11 and α13 obtained by summing the misfire parameters α0 and α1 or the misfire parameters α0 and α3 assumed when the multi-cylinder misfire occurs in the combination (c0, c1) of the subject cylinder c0 and the first reference cylinder c1 and the combination (c0, c3) of the subject cylinder c0 and the third reference cylinder c3 among the plurality of cylinders. The threshold A4 is set in consideration of the amount of decrease in the plurality of misfire parameters α assumed at the time of facing misfire due to weak combustion. That is, the threshold A4 is set in association with a change in the sum parameter α12 obtained by summing the misfire parameters α0 and α2 assumed when the multi-cylinder misfire occurs in the combination (c0, c2) of the subject cylinder c0 and the second reference cylinder c2 among the plurality of cylinders.

More specifically, when a value obtained by adding the misfire parameters α ("O" marks in FIG. 4) of the cylinders in the normal cycle corresponding to the sum parameters α11, α12, and α13 is set as the sum parameter in the normal cycle, the thresholds A3 and A4 are set to values larger than the sum parameters α11, α12, and α13 in the misfire cycle and smaller than the sum parameter in the normal cycle. A value obtained by doubling the misfire parameter α (the misfire parameter α in the subject cylinder c0) of the normal cycle assumed at the time of weak combustion may be used as the sum parameter in the normal cycle. The threshold A3 and the threshold A4 may be set to the same value. The threshold A3 may be set to different values for the preceding continuous misfire and the subsequent continuous misfire.

A difference between the sum parameters α11, α12, α13 in the misfire cycle and the sum parameter in the normal cycle is larger than the difference Δα (FIG. 4) between the misfire parameter α in the misfire cycle and the misfire parameter α in the normal cycle. Therefore, it is easy to set the thresholds A3 and A4 so as to satisfy the condition that the threshold is larger than the sum parameters α11, α12, α13 in the misfire cycle and smaller than the sum parameter in the normal cycle. When determining that the sum parameter α10 is less than the threshold A3, the comparison circuit 52 outputs a flag signal f1 indicating a possibility that the preceding continuous misfire has occurred. When determining that the sum parameter α12 is less than the threshold A4, the comparison circuit 53 outputs a flag signal f2 indicating a possibility that the facing misfire has occurred. When determining that the sum parameter α13 is less than the threshold A3, the comparison circuit 54 outputs a flag signal f3 indicating a possibility that the subsequent continuous misfire has occurred.

When any one of the flag signals f0 to f3 is input, the OR circuit 56 outputs the relevant flag signal f0 to f3. When none of the flag signals f0 to f3 is input, the OR circuit 56 outputs an off signal.

The AND circuit 57 has a function as a determination circuit that determines the presence or absence of misfire of the engine 1. When any of the flag signals f0 to f3 is output from the OR circuit 56 and the flag signal f4 is output from the comparison circuit 55, the AND circuit 57 determines that misfire has occurred in the engine 1, that is, the engine 1 is operating in the misfire cycle. On the other hand, when the off signal is output from the OR circuit 56 or the flag signal f4 is not output from the comparison circuit 55, the AND circuit 57 determines that no misfire has occurred in the engine 1, that is, the engine 1 is operating in the normal cycle.

When determining that the engine 1 is operating in the misfire cycle, the AND circuit 57 further specifies the misfire pattern (a manner of misfire) according to the flag signals f0 to f3. That is, when the flag signal f0 is output and none of the flag signals f1 to f3 is output, the AND circuit 57 determines that the single-cylinder misfire has occurred in the subject cylinder c0. When the flag signal f1 is output and the flag signal f0 is not output, the AND circuit 57 determines that the multi-cylinder misfire (preceding continuous misfire) has occurred in the subject cylinder c0 and the first reference cylinder c1. When the flag signal f2 is output and the flag signal f0 is not output, the AND circuit 57 determines that the multi-cylinder misfire (facing misfire) has occurred in the subject cylinder c0 and the second reference cylinder c2. When the flag signal f3 is output and the flag signal f0 is not output, the AND circuit 57 determines that the multi-cylinder misfire (subsequent continuous misfire) has occurred in the subject cylinder c0 and the third reference cylinder c3. When the flag signal f0 is output and any of the flag signals f1 to f3 is output, the AND circuit 57 determines that the single-cylinder misfire has occurred in the subject cylinder c0 or the multi-cylinder misfire has occurred in a plurality of cylinders including the subject cylinder c0.

When the AND circuit 57 determines that misfire has occurred in the engine 1, the controller 20 (FIG. 2) executes processing of suppressing the misfire. For example, when an ignition period is retarded, the controller 20 outputs a control signal to an ignition plug 11 to perform correction to advance the ignition period. Alternatively, the controller 20 outputs a control signal to an injector 12 to change an injection pattern and an injection timing.

FIG. 7 is a diagram illustrating the relationship between the flag signals f0 to f4 and the misfire pattern. In FIG. 7, an "O" mark indicates that the flag signal f0 to f4 is output, and an "x" mark indicates that the flag signal f0 to f4 is not output. For the flag signals f1 to f3, a case where any of the flag signals f1 to f3 is output is indicated by the "O" mark, and a case where none of the flag signals f1 to f3 is output is indicated by the "x" mark. When the flag signal f0 to f4 is output, at least the subject cylinder c0 is misfired, and cases where the normal combustion has occurred in the subject cylinder c0 and the misfire has occurred in other cylinders are not assumed here.

As illustrated in FIG. 7, when the flag signal f0 and the flag signal f4 are output and the flag signals f1 to f3 are not output, the misfire parameter α0 is less than the threshold A1 (FIG. 6), and it is determined that the single-cylinder misfire has occurred in the subject cylinder c0. When none of the flag signals f0 to f4 is output, it is determined that the engine 1 is combusted in the normal cycle.

Even when the flag signal f4 is output and the flag signals f0 to f3 are not output, it is determined that the engine 1 is combusted in the normal cycle. This case is considered such that although no misfire has occurred in the subject cylinder c0, the flag signal f4 is output since the misfire parameter α0 of the subject cylinder c0 becomes smaller than the threshold A2 due to weak combustion. That is, since the threshold A2 is larger than the threshold A1, the misfire parameter α0 may be smaller than the threshold A2 although no misfire occurs. However, in the present embodiment, not only that the flag signal f4 is output, but also that any of the flag signals f1 to f3 is output is set as the condition of the multi-cylinder misfire. Therefore, even in a case where α0<A2 is satisfied, the occurrence of the multi-cylinder misfire can be reliably determined to be distinguished from the normal combustion.

When the flag signal f0 and the flag signal f4 are output and any of the flag signals f1 to f3 is further output, it is determined that the single-cylinder misfire has occurred in the subject cylinder c0 or the multi-cylinder misfire has occurred in a plurality of cylinders including the subject cylinder c0. When any of the flag signals f1 to f3 is output and none of the flag signals f0 and f4 is output, it is considered that although no misfire occurs in the subject cylinder c0, any of the flag signals f1 to f3 is output since any of the sum parameters α11 to α13 becomes smaller than the thresholds A3 and A4 due to weak combustion. Therefore, it is determined that the engine 1 is combusted in the normal cycle.

When any of the flag signals f1 to f3 and the flag signal f4 are output and the flag signal f0 is not output, it is determined that multi-cylinder misfire has occurred in a plurality of cylinders including the subject cylinder c0. If the output of the flag signal f4 without the output of the flag signal f0 is set as a condition for the determination on the multi-cylinder misfire, it may be erroneously determined that the misfire has occurred although the engine 1 is combusted normally. On the other hand, by adding the output of any of the flag signals f1 to f3 to the condition for the determination on the multi-cylinder misfire, the presence or absence of occurrence of the multi-cylinder misfire can be determined reliably.

The present embodiment can achieve advantages and effects such as the following:

(1) A misfire determination apparatus 10 for an internal combustion engine includes: a crank angle sensor 21 that detects a rotational speed of a crankshaft 107 of an engine 1 having a plurality of cylinders; a parameter calculation unit 40 that calculates a misfire parameter α having a correlation with a change amount of a rotational speed in a combustion stroke of each of the plurality of cylinders, that is, a misfire parameter α which increases as an increase amount of the rotational speed increases, on the basis of the rotational speed detected by the crank angle sensor 21; and a determination unit 50 that has a comparison circuit 51 that determines whether or not a misfire parameter α0 calculated by the parameter calculation unit 40 (base parameter calculation unit 41) is less than a threshold A1 (a first predetermined value), and a comparison circuit 55 that determines whether or not the misfire parameter α0 is less than a threshold A2 (a second predetermined value) larger than the threshold A1, and determines the presence or absence of misfire of the engine 1 according to determination results of the comparison circuits 51 and 55 (FIG. 5). When the comparison circuit 51 determines that the misfire parameter α0 is less than the threshold A1, the determination unit 50 determines that single-cylinder misfire, which is misfire in a single cylinder of the plurality of cylinders, has occurred, and when the comparison circuit 55 determines that the misfire parameter α0 is less than the threshold A2, the determination unit 50 determines that the single-cylinder misfire or multi-cylinder misfire, which is misfire in two or more cylinders of the plurality of cylinders, has occurred (FIG. 5).

With this configuration, it is possible to satisfactorily determine the presence or absence of the multi-cylinder misfire of the engine 1. That is, since the amount of decrease in the misfire parameter α0 is different between the single-cylinder misfire and the multi-cylinder misfire, it is difficult to accurately determine the presence or absence of misfire only by comparing the misfire parameter α0 with the single threshold A1 or A2. However, it is possible to accurately determine the presence or absence of the single-cylinder misfire and the multi-cylinder misfire by comparing the misfire parameter α0 with two thresholds A1 and A2 different from each other.

(2) The determination unit 50 identifies a subject cylinder c0, which is a cylinder during the combustion stroke or immediately after completion of the combustion stroke, among the plurality of cylinders, determines that the single-cylinder misfire has occurred in the subject cylinder c0 when the misfire parameter α0 is determined to be less than the threshold A1, and determines that the multi-cylinder misfire has occurred in two cylinders including the subject cylinder c0 when the misfire parameter α0 is determined to be equal to or greater than the threshold A1 and less than the threshold A2 (FIG. 6). As a result, the cylinder in which the misfire has occurred can be identified, and the single-cylinder misfire and the multi-cylinder misfire can be determined to be distinguished.

(3) The parameter calculation unit 40 calculates, on the basis of the rotational speed detected by the crank angle sensor 21, the misfire parameter α0 having a correlation with the amount of change in the rotational speed in the combustion stroke of the subject cylinder c0 and the misfire parameters α1 to α3 having a correlation with the amount of change in the rotational speed in the combustion stroke of the reference cylinders c1 to c3 within a range of a crank angle which is one cycle of the engine 1 back from the combustion stroke of the subject cylinder c0 as a starting point, and calculates sum parameters (a sum misfire parameter) α11 to α13, each of which is a sum of the misfire parameter α0 and any one of the misfire parameters α1 to α3 (FIG. 5). The determination unit 50 further has comparison circuits 52 to 54 that determine whether or not the sum parameters α11 to α13 calculated by the parameter calculation unit 40 are less than the thresholds A3 and A4 (third threshold) (FIG. 5). Then, when the comparison circuit 51 determines that the misfire parameter α0 is less than the threshold A1, or the comparison circuits 52 to 54 determine that the sum parameters α11 to α13 are less than the thresholds A3 and A4, and the comparison circuit 55 determines that the misfire parameter α0 is less than the threshold A2, the determination unit 50 determines that misfire has occurred in the subject cylinder c0. When the comparison circuit 51 determines that the misfire parameter α0 is equal to or greater than the threshold A1, and the comparison circuits 52 to 54 determine that the sum parameters α11 to α13 are equal to or greater than the thresholds A3 and A4, even if the comparison circuit 55 determines that the misfire parameter α0 is less than the threshold A2, the determination unit 50 determines that no misfire has occurred in the subject cylinder c0 (FIGS. 5 and 7). The characteristics of the misfire parameter α at the time of multi-cylinder misfire can be satisfactorily reflected by the sum parameters α11 to α13. Therefore, by using the sum parameters α11 to α13, the presence or absence of multi-cylinder misfire can be accurately determined.

(4) When the comparison circuit 51 determines that the misfire parameter α0 is less than the threshold A1 and the comparison circuits 52 to 54 determine that the sum parameters α11 to α13 are equal to or greater than the thresholds A3 and A4, the determination unit 50 determines that single-cylinder misfire has occurred in the subject cylinder c0 (FIGS. 5 and 7). That is, when the misfire parameter α0 is less than the threshold A1, a condition that the misfire parameter α0 is less than the threshold A2 is satisfied, so that the determination unit 50 can determine that the single-cylinder misfire has occurred in the subject cylinder c0 without comparing the magnitude of the misfire parameter α0 and the threshold A2. As a result, the presence or absence of occurrence of the single-cylinder misfire can be accurately determined.

(5) When the comparison circuit 51 determines that the misfire parameter α0 is equal to or greater than the threshold A1, the comparison circuit 55 determines that the misfire parameter α0 is less than the threshold A2, and the comparison circuits 52 to 54 determine that the sum parameters α11 to α13 are less than the thresholds A3 and A4, the determination unit 50 determines that multi-cylinder misfire has occurred in two cylinders including the subject cylinder c0 (FIGS. 5 and 7). As a result, the presence or absence of occurrence of the multi-cylinder misfire can be accurately determined.

(6) The threshold A1 is set in advance in association with a change in the misfire parameter α0 when the single-cylinder misfire occurs in each of the plurality of cylinders (FIG. 6). By setting the threshold A1 in this manner, it is possible to clearly distinguish between the single-cylinder misfire and the multi-cylinder misfire, and to accurately detect the occurrence of the single-cylinder misfire.

(7) The threshold A2 is set in advance in association with a change in the misfire parameter α0 when the multi-cylinder misfire occurs in two cylinders including all combinations of the plurality of cylinders (FIG. 6). By setting the threshold A2 in this manner, it is possible to clearly distinguish between the single-cylinder misfire and the multi-cylinder misfire, and to accurately detect the occurrence of the multi-cylinder misfire.

(8) The thresholds A3 and A4 are set in advance in association with changes in the sum parameters α11 to α13 when the multi-cylinder misfire occurs in two cylinders including all combinations of the plurality of cylinders. By setting the thresholds A3 and A4 in this manner, it is possible to clearly distinguish between the multi-cylinder misfire and the normal combustion, and to accurately detect the occurrence of the multi-cylinder misfire.

In the above embodiment, the engine 1 is configured to have four cylinders. However, as long as the engine is configured to have a plurality of cylinders, the number of cylinders is not limited to four and may be five or more. In the case where the number of cylinders is, for example, six, every time the crank angle θ changes by 120°, a combustion stroke is sequentially started with different cylinders. In this case, the parameter calculation unit 40 may calculate the misfire parameter α for the subject cylinder c0 based on crank angle data detected by the crank angle sensor 21 from the start of the combustion stroke in the subject cylinder c0 until the start of the combustion stroke in the subsequent cylinder (another cylinder) (until the crank angle θ changes by 120°). Thus, even if the number of cylinders is 5 or more, it is possible to accurately determine the presence or absence of misfire in the engine 1.

Figure 8:
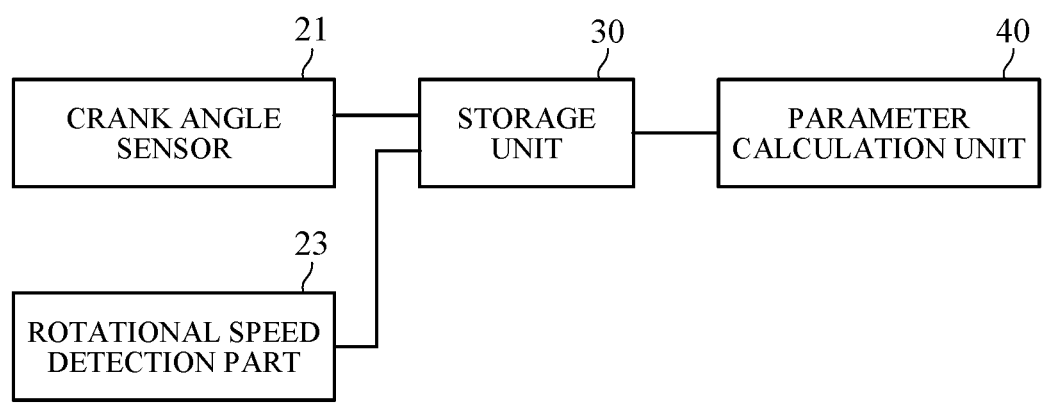
FIG. 8 is a diagram illustrating a modification of a part of FIG. 5.

In the above embodiment, the misfire determination apparatus 10 is applied to the engine vehicle traveling by the power of the engine 1, but it is also possible to apply the misfire determination apparatus to a hybrid vehicle including the engine 1 and a traveling motor. In this case, as illustrated in FIG. 8, the misfire determination apparatus 10 further includes a rotational speed detection part 23 such as a resolver that detects the rotational speed of the traveling motor, and the parameter calculation unit 40 may calculate the misfire parameter α based on crank angle data detected by the crank angle sensor 21 (a first rotational speed detector) and the rotational speed of the traveling motor detected by the rotational speed detection part 23 (a second rotational speed detector). Accordingly, it is possible to accurately determine the presence or absence of misfire of the engine 1 by excluding an influence on the rotational speed of the engine 1 caused by the rotation of the traveling motor. An electric equipment rotationally driven by the power of the engine 1 may be another electric equipment such as a generator instead of a traveling motor, and the rotational speed detection part 23 may detect the rotational speed of the generator or the like. A sensor for detecting a load acting on the electric equipment may be provided, and the parameter calculation unit 40 may calculate the misfire parameter α based on the load detected by this sensor and the crank angle data.

In the above embodiment, the case where misfire occurs in two cylinders among the plurality of cylinders of the engine 1 as an internal combustion engine in one cycle of combustion of the engine 1 is described as an example of the multi-cylinder misfire. However, the number of cylinders in which the multi-cylinder misfire is not limited to two and may be three or more. In the above embodiment, the rotational speed of the crankshaft (an output shaft) 107 of the engine 1 is detected by the crank angle sensor 21. However, the configuration of a rotational speed detector is not limited to the above configuration. In the above embodiment, the parameter calculation unit 40 calculates the misfire parameter α in the combustion stroke of each of the plurality of cylinders over one cycle of the engine 1 based on the crank angle data stored in the storage unit 30. That is, the parameter calculation unit 40 calculates, based on the crank angle data, the misfire parameter $\alpha 0$ (a first misfire parameter) having a correlation with the change amount of the rotational speed in the combustion stroke of the subject cylinder c0, the misfire parameters $\alpha 1$ to $\alpha 3$ (a second misfire parameter) having a correlation with the change amount of the rotational speed in the combustion stroke of the reference cylinders c1 to c3 in the range of the crank angle going back by one cycle from the combustion stroke of the subject cylinder c0, and the sum parameters (sum misfire parameters) $\alpha 11$ to $\alpha 13$ that are the sum of the misfire parameter $\alpha 0$ and the misfire parameters $\alpha 1$ to $\alpha 3$. However, the configuration of a parameter calculation unit may be any configuration as long as it calculates, as a misfire parameter, a value that has a correlation with the change amount of the rotational speed in the combustion stroke and increases as the increase amount of the rotational speed increases.

In the above embodiment, the comparison circuit 51 as a first determination unit determines whether or not $\alpha 0 < A1$, the comparison circuit 55 as a second determination unit determines whether or not $\alpha 0 < A2$ in the comparison circuit 55, the comparison circuits 52 to 54 as the third determination unit determine whether or not $\alpha 11 < A3$, $\alpha 12 < A4$ and $\alpha 13 < A3$, and whether or not misfire of the engine 1 has occurred is determined according to these determination results. However, the configuration of a misfire determination unit is not limited to this. For example, the third determination unit may be excluded from the misfire determination unit, and the presence or absence of misfire in the subject cylinder c0 may be determined in accordance with the determination results of the first determination unit and the second determination unit without passing through the AND circuit 57 of FIG. 5. In the above embodiment, various threshold A1 (a first predetermined value), threshold A2 (a second predetermined value), and threshold A3 and A4 (a third predetermined value) are stored in the storage unit 30 in advance. In this regard, the value of the threshold A1 may be any value as long as it is set to a value capable of determining whether a single-cylinder misfire has occurred or not in accordance with the misfire parameter. The value of the threshold A2 may be any value as long as it is set to a value capable of determining whether a single-cylinder misfire or a multi-cylinder misfire has occurred in accordance with the misfire parameter. The value of the thresholds A3 and A4 may be any value as long as it is set the value capable of determining whether a multi-cylinder misfire has occurred in accordance with a sum misfire parameter. The thresholds A1 to A4 varies depending on an operating conditions of the engine 1. For this reason, the thresholds A1 to A4 may be stored in advance by a map or the like according to the operating conditions.

In the above embodiment, when the misfire parameter $\alpha 0$ of the subject cylinder c0 is less than the threshold A1, it is determined that a single-cylinder misfire has occurred. However, even in the case of a multi-cylinder misfire, the misfire parameter $\alpha 0$ may be less than the threshold A1. For example, under a limited condition of an engine, when a resonance occurs in a power plant at the rime of an occurrence of misfire and a facing misfire and a subsequent continuous misfire have occurred (when not preceding continuous misfire) due to a reaction from a transmission provided in a torque transmission path between the engine and the axle, the misfire parameter $\alpha 0$ may be less than a threshold A1. In view of this point, when the first determination unit determines that the misfire parameter $\alpha 0$ is less than the threshold A1, the misfire determination unit may determine that a single-cylinder misfire, which is a misfire in the subject cylinder c0, occurs or a multi-cylinder misfire (referred as a first multi-cylinder misfire), which is a misfire in two or more cylinders ((c0, c2) or (c0, c3)) including the subject cylinder c0 and not including the cylinder (a first reference cylinder c1) in which the combustion stroke is started immediately before the combustion stroke is started in the subject cylinder c0, occurs. Further, when the second determination unit determines that the misfire parameter α0 is less than the threshold A2, the misfire determination unit may determine that the single-cylinder misfire occurs or a multi-cylinder misfire (referred as a second multi-cylinder misfire), which is a misfire in two or more cylinders ((c0, c1), (c0, c2) or (c0, c3)) including the subject cylinder c0, occurs.

The invention can be also configured as a misfire determination method for an internal combustion engine 1 including a plurality of cylinders and an output shaft, the misfire determination method including: detecting a rotational speed of the output shaft; calculating a misfire parameter having a correlation with a change amount of the rotational speed in a combustion stroke of each of the plurality of cylinders based on the rotational speed, the misfire parameter increasing as an increase amount of the rotational speed is large; and determining whether a misfire of the internal combustion engine has occurred and a manner of the misfire, based on the misfire parameter, wherein the manner of the misfire includes a single-cylinder misfire where the misfire has occurred in a single cylinder among the plurality cylinders and a multi-cylinder misfire where the misfire has occurred in two or more cylinders among the plurality cylinders, and the determining includes determining that the single-cylinder misfire has occurred when the misfire parameter is less than a first predetermined value, while determining that the single-cylinder misfire or the multi-cylinder misfire has occurred when the misfire parameter is less than a second predetermined value greater than the first predetermined value.

The above embodiment can be combined as desired with one or more of the above modifications. The modifications can also be combined with one another.

According to the present invention, it is possible to satisfactorily determine whether misfire has occurred in an internal combustion engine even if misfire has occurred in a plurality of cylinders.

Above, while the present invention has been described with reference to the preferred embodiments thereof, it will be understood, by those skilled in the art, that various changes and modifications may be made thereto without departing from the scope of the appended claims.

What is claimed is:

1. A misfire determination apparatus for an internal combustion engine including a plurality of cylinders and an output shaft, the misfire determination apparatus comprising:
   a rotational speed detector configured to detect a rotational speed of the output shaft; and
   an electronic control unit having a microprocessor and a memory connected to the microprocessor, wherein
   the microprocessor is configured to perform:
      calculating a misfire parameter having a correlation with a change amount of the rotational speed in a combustion stroke of each of the plurality of cylinders based on the rotational speed detected by the rotational speed detector, the misfire parameter increasing as an increase amount of the rotational speed is large; and
      determining whether a misfire of the internal combustion engine has occurred and a manner of the misfire, based on the misfire parameter, the manner of the misfire includes a single-cylinder misfire where the misfire has occurred in a single cylinder among the plurality of cylinders and a multi-cylinder misfire where the misfire has occurred in two or more cylinders among the plurality of cylinders, and the microprocessor is configured to further perform:
      the calculating including calculating the misfire parameter based on a relative rotational speed with respect to a rotational speed detected at a compression top dead center of the each of the plurality of cylinders; and
      the determining including identifying a cylinder during the combustion stroke among the plurality of cylinders defined as a subject cylinder, and determining that the single-cylinder misfire has occurred in the subject cylinder when the misfire parameter is less than a first predetermined value, while determining that the multi-cylinder misfire has occurred in two or more cylinders including the subject cylinder when the misfire parameter is equal to or greater than the first predetermined value and less than a second predetermined value greater than the first predetermined value.

2. The misfire determination apparatus according to claim 1, wherein
   the first predetermined value is set in advance in association with a change in the misfire parameter when the single-cylinder misfire occurs respectively in the each of the plurality of cylinders in different combustion cycles.

3. The misfire determination apparatus according to claim 1, wherein
   a number of the plurality of cylinders is equal to or more than five, and
   the microprocessor is configured to perform
      the calculating including calculating the misfire parameter for the subject cylinder based on the rotational speed detected by the rotational speed detector from a start of the combustion stroke in the subject cylinder until a start of the combustion stroke in another cylinder where the combustion stroke is started following the subject cylinder.

4. The misfire determination apparatus according to claim 1, wherein
   the rotational speed detector is a first rotational speed detector,
   the misfire determination apparatus further comprises a second rotational speed detector configured to detect a rotational speed of an electric equipment driven to rotate by a power output from the internal combustion engine, and
   the microprocessor is configured to perform
      the calculating including calculating the misfire parameter based on the rotational speed of the output shaft of the internal combustion engine detected by the first rotational speed detector and the rotational speed of the electric equipment detected by the second rotational speed detector.

5. The misfire determination apparatus according to claim 1, wherein
   the plurality of cylinders include a first cylinder and a second cylinder,
   the internal combustion engine includes a first piston disposed slidably in the first cylinder and a second piston disposed slidably in the second cylinder, and
   the microprocessor is configured to perform
      the calculating further including calculating a first relative rotational speed in the first cylinder at every predetermined crank angle of the internal combustion engine by subtracting a first base rotational speed from the rotational speed detected by the rotational speed detector when the first cylinder is in the combustion stroke and calculating the misfire parameter of the first cylinder based on the first relative rotational speed, the first base rotational speed being a rotational speed detected by the rotational speed detector when the first piston is positioned at a compression top dead center, and the calculating further including calculating a second relative rotational speed in the second cylinder at the every predetermined crank angle of the internal combustion engine, by subtracting a second base rotational speed from the rotational speed detected by the rotational speed detector when the second cylinder is in the combustion stroke and calculating the misfire parameter of the second cylinder based on the second relative rotational speed, the second base rotational speed being a rotational speed detected by the rotational speed detector when the second piston is positioned at the compression top dead center.

6. The misfire determination apparatus according to claim 5, wherein the microprocessor is configured to perform the calculating further including calculating the misfire parameter of the first cylinder by integrating the first relative rotational speed over the combustion stroke of the first cylinder and the misfire of the second cylinder by integrating the second relative rotational speed over the combustion stroke of the second cylinder.

7. The misfire determination apparatus according to claim 5, wherein the memory is configured to store the rotational speed detected by the rotational speed detector at the every predetermined crank angle during a period from a start of an intake stroke to an end of an exhaust stroke of the each of the plurality of cylinders, and the microprocessor is configured to perform the calculating further including calculating the misfire parameter of the each of the plurality of cylinders by using the rotational speed stored by the memory.

8. The misfire determination apparatus according to claim 1, wherein the plurality of cylinders include the subject cylinder and a reference cylinder different from the subject cylinder, and the microprocessor is configured to perform the calculating including calculating a first misfire parameter and a second misfire parameter based on the rotational speed detected by the rotational speed detector, and a sum of the first misfire parameter and the second misfire parameter defined as a sum misfire parameter, the first misfire parameter having a correlation with a change amount of the rotational speed in the combustion stroke of the subject cylinder, the second misfire parameter having a correlation with a change amount of the rotational speed in the combustion stroke of the reference cylinder in a range going back from the combustion stroke of the subject cylinder by one cycle of the internal combustion engine, and the microprocessor is configured to perform the determining further including determining that the misfire has occurred in the subject cylinder when the first misfire parameter is less than the first predetermined value or when the sum misfire parameter is less than a third predetermined value and the first misfire parameter is less than the second predetermined value, while determining that the misfire has not occurred in the subject cylinder when the first misfire parameter is equal to or greater than the first predetermined value and the sum misfire parameter is equal to or greater than the third predetermined value, even if the first misfire parameter is less than the second predetermined value.

9. The misfire determination apparatus according to claim 8, wherein the microprocessor is configured to perform the determining further including determining that the single-cylinder misfire has occurred in the subject cylinder when the first misfire parameter is less than the first predetermined value and the sum misfire parameter is equal to or greater than the third predetermined value.

10. The misfire determination apparatus according to claim 8, wherein the microprocessor is configured to perform the determining further including determining that the multi-cylinder misfire has occurred in two or more cylinders including the subject cylinder and the reference cylinder when the first misfire parameter is equal to or greater than the first predetermined value and less than the second predetermined value and the sum misfire parameter is less than the third predetermined value.

11. The misfire determination apparatus according to claim 8, wherein the second predetermined value is set in advance in association with a change in the first misfire parameter when the multi-cylinder misfire occurs in the two or more cylinders including all combinations among the plurality of cylinders.

12. The misfire determination apparatus according to claim 8, wherein the third predetermined value is set in advance in association with a change in the sum misfire parameter when the multi-cylinder misfire occurs in the two or more cylinders including all combinations among the plurality of cylinders.

13. A misfire determination method for an internal combustion engine including a plurality of cylinders and an output shaft, the misfire determination method comprising:

detecting a rotational speed of the output shaft;

calculating a misfire parameter having a correlation with a change amount of the rotational speed in a combustion stroke of each of the plurality of cylinders based on the rotational speed, the misfire parameter increasing as an increase amount of the rotational speed is large; and determining whether a misfire of the internal combustion engine has occurred and a manner of the misfire, based on the misfire parameter, wherein the manner of the misfire includes a single-cylinder misfire where the misfire has occurred in a single cylinder among the plurality of cylinders and a multi-cylinder misfire where the misfire has occurred in two or more cylinders among the plurality of cylinders, the calculating includes calculating the misfire parameter based on a relative rotational speed with respect to a rotational speed detected at a compression top dead center of the each of the plurality of cylinders, and the determining includes identifying a cylinder during the combustion stroke among the plurality of cylinders defined as a subject cylinder, and determining that the single-cylinder misfire has occurred in the subject cylinder when the misfire parameter is less than a first predetermined value, while determining that the multi-cylinder misfire has occurred in two or more cylinders including the subject cylinder when the misfire parameter is equal to or greater than the first predetermined value and less than a second predetermined value greater than the first predetermined value.

14. A misfire determination apparatus for an internal combustion engine including a plurality of cylinders and an output shaft, the misfire determination apparatus comprising:
   a rotational speed detector configured to detect a rotational speed of the output shaft; and
   an electronic control unit having a microprocessor and a memory connected to the microprocessor, wherein
   the microprocessor is configured to perform:
      calculating a misfire parameter having a correlation with a change amount of the rotational speed in a combustion stroke of each of the plurality of cylinders based on the rotational speed detected by the rotational speed detector, the misfire parameter increasing as an increase amount of the rotational speed is large; and
      determining whether a misfire of the internal combustion engine has occurred and a manner of the misfire, based on the misfire parameter, the manner of the misfire includes a single-cylinder misfire where the misfire has occurred in a single cylinder among the plurality of cylinders and a multi-cylinder misfire where the misfire has occurred in two or more cylinders among the plurality of cylinders, and
   the microprocessor is configured to perform
      the determining including identifying a cylinder during the combustion stroke among the plurality of cylinders defined as a subject cylinder, and determining that the single-cylinder misfire has occurred in the subject cylinder when the misfire parameter is less than a first predetermined value, while determining that the multi-cylinder misfire has occurred in two or more cylinders including the subject cylinder when the misfire parameter is equal to or greater than the first predetermined value and less than a second predetermined value greater than the first predetermined value,
   the plurality of cylinders include the subject cylinder and a reference cylinder different from the subject cylinder, and
   the microprocessor is configured to further perform
      the calculating including calculating a first misfire parameter and a second misfire parameter based on the rotational speed detected by the rotational speed detector, and a sum of the first misfire parameter and the second misfire parameter defined as a sum misfire parameter, the first misfire parameter having a correlation with a change amount of the rotational speed in the combustion stroke of the subject cylinder, the second misfire parameter having a correlation with a change amount of the rotational speed in the combustion stroke of the reference cylinder in a range going back from the combustion stroke of the subject cylinder by one cycle of the internal combustion engine, and
      the determining further including determining that the misfire has occurred in the subject cylinder when the first misfire parameter is less than the first predetermined value or when the sum misfire parameter is less than a third predetermined value and the first misfire parameter is less than the second predetermined value, while determining that the misfire has not occurred in the subject cylinder when the first misfire parameter is equal to or greater than the first predetermined value and the sum misfire parameter is equal to or greater than the third predetermined value, even if the first misfire parameter is less than the second predetermined value.

* * * * *